(12) United States Patent
Tsuchizawa

(10) Patent No.: US 11,401,003 B2
(45) Date of Patent: Aug. 2, 2022

(54) HUMAN-POWERED VEHICLE CONTROL DEVICE

(71) Applicant: Shimano Inc., Osaka (JP)

(72) Inventor: Yasuhiro Tsuchizawa, Osaka (JP)

(73) Assignee: Shimano Inc., Osaka (JP)

( * ) Notice: Subject to any disclaimer, the term of this patent is extended or adjusted under 35 U.S.C. 154(b) by 148 days.

(21) Appl. No.: 16/353,373

(22) Filed: Mar. 14, 2019

(65) Prior Publication Data

US 2019/0291814 A1    Sep. 26, 2019

(30) Foreign Application Priority Data

Mar. 22, 2018  (JP) .............................. JP2018-054913

(51) Int. Cl.
*B62M 6/50* (2010.01)
*B62M 6/55* (2010.01)

(52) U.S. Cl.
CPC ................ *B62M 6/50* (2013.01); *B62M 6/55* (2013.01)

(58) Field of Classification Search
CPC ................................... B62M 6/50; B62M 6/55
See application file for complete search history.

(56) References Cited

U.S. PATENT DOCUMENTS

| | | | |
|---|---|---|---|
| 6,320,336 B1 | 11/2001 | Eguchi | |
| 2014/0081496 A1* | 3/2014 | Chun | B62M 6/45 701/22 |
| 2017/0113756 A1* | 4/2017 | Yoshiie | H02K 11/24 |
| 2018/0029666 A1 | 2/2018 | Shahana et al. | |
| 2018/0126949 A1* | 5/2018 | Turnwald | B60R 22/48 |
| 2019/0035263 A1* | 1/2019 | Loes | G08G 1/095 |
| 2019/0337530 A1* | 11/2019 | Hiramatsu | G05D 1/0088 |
| 2020/0355128 A1* | 11/2020 | Kinjo | F02D 41/042 |

FOREIGN PATENT DOCUMENTS

| | | |
|---|---|---|
| CN | 107662689 A | 2/2018 |
| DE | 10 2017 103 735 A1 | 8/2017 |
| DE | 10 2017 212 865 A1 | 2/2018 |

(Continued)

OTHER PUBLICATIONS

Machine translation of JPH1059262A.*

*Primary Examiner* — Tyler J Lee
*Assistant Examiner* — Yufeng Zhang
(74) *Attorney, Agent, or Firm* — Global IP Counselors, LLP

(57) ABSTRACT

A human-powered vehicle control device includes an electronic controller that controls a motor, which assists in propulsion of a human-powered vehicle in accordance with a human driving force inputted to the human-powered vehicle. The electronic controller is configured to change a response speed of the motor with respect to a change in the human driving force in accordance with a parameter. The parameter includes at least one of a travel resistance of the human-powered vehicle, a torque of the human driving force, a transmission ratio of the human-powered vehicle, a wheel size of the human-powered vehicle, an air resistance coefficient, a value related to a front surface projection area of a rider of the human-powered vehicle, a wind velocity, a rolling resistance coefficient, a value related to a weight of a carried load of the human-powered vehicle, and an acceleration of the human-power vehicle.

18 Claims, 7 Drawing Sheets

(56) References Cited

FOREIGN PATENT DOCUMENTS

| | | | | |
|---|---|---|---|---|
| JP | 9-39873 | A | 2/1997 | |
| JP | 10-59260 | A | 3/1998 | |
| JP | H1059262 | A * | 3/1998 | ............. B62M 6/45 |
| JP | 11-29086 | A | 2/1999 | |
| JP | 11-59557 | A | 3/1999 | |
| JP | 11-351947 | A | 12/1999 | |
| JP | 2000-118477 | A | 4/2000 | |
| JP | 2002-321680 | A | 11/2002 | |
| JP | 4518298 | B2 | 8/2010 | |
| JP | 4518299 | B2 | 8/2010 | |
| JP | 4518300 | B2 | 8/2010 | |
| JP | 4518301 | B2 | 8/2010 | |
| JP | 4608764 | B2 | 1/2011 | |
| JP | 2018-24416 | A | 2/2018 | |

* cited by examiner

HUMAN-POWERED VEHICLE CONTROL DEVICE

CROSS-REFERENCE TO RELATED APPLICATIONS

This application claims priority to Japanese Patent Application No. 2018-054913, filed on Mar. 22, 2018. The entire disclosure of Japanese Patent Application No. 2018-054913 is hereby incorporated herein by reference.

BACKGROUND

Technical Field

The present invention generally relates to a human-powered vehicle control device.

Background Information

For example, Japanese Laid-Open Patent Publication No. 10-59260 {patent document 1) discloses a human-powered vehicle control device that controls a motor in accordance with an output of a detector.

SUMMARY

One object of the present disclosure is to provide a human-powered vehicle control device that appropriately controls a motor.

A human-powered vehicle control device according to a first aspect of the present disclosure comprises an electronic controller that controls a motor, which assists in propulsion of a human-powered vehicle, in accordance with human driving force input to the human-powered vehicle. The electronic controller is configured to change a response speed of the motor with respect to a change in the human driving force in accordance with a parameter. The parameter includes at least one of a travel resistance of the human-powered vehicle, a torque of the human driving force, a transmission ratio of the human-powered vehicle, a wheel size of the human-powered vehicle, an air resistance coefficient, a value related to a front surface projection area of a rider of the human-powered vehicle, a wind velocity, a rolling resistance coefficient, a value related to a weight of a carried load of the human-powered vehicle, and an acceleration of the human-power vehicle.

With the human-powered vehicle control device according to the first aspect, the response speed of the motor is changed with respect to a change in human driving force in accordance with the parameter, which affects the travel load. Thus, the motor is appropriately controlled.

In accordance with a second aspect of the present disclosure, the human-powered vehicle control device according to the first aspect is configured so that the electronic controller is configured to set the response speed for a case where the human driving force is increasing and a value of the parameter is greater than or equal to a first predetermined value to be higher than the response speed for a case where the human driving force is increasing and the value of the parameter is less than the first predetermined value.

With the human-powered vehicle control device according to the second aspect, in a case where human driving force is increasing and a value of the parameter is greater than or equal to the first predetermined value, the output of the motor is increased more promptly than in a case where the value of the parameter is less than the first predetermined value. Thus, in a case where the travel load is large, increases in the load on the rider are limited.

In accordance with a third aspect of the present disclosure, the human-powered vehicle control device according to the first or second aspect is configured so that the electronic controller is configured to set the response speed for a case where the human driving force is increasing to be higher as a value of the parameter increases.

With the human-powered vehicle control device according to the third aspect, the response speed for a case where human driving force is increasing is set to be higher as the value of the parameter increases. Thus, as the travel load increases, the output of the motor is promptly increased.

In accordance with a fourth aspect of the present disclosure, the human-powered vehicle control device according to any one of the first to third aspects is configured so that the electronic controller is configured to set the response speed for a case where the human driving force is decreasing and a value of the parameter is greater than or equal to a second predetermined value to be lower than the response speed for a case where the human driving force is decreasing and the value of the parameter is less than the second predetermined value.

With the human-powered vehicle control device according to the fourth aspect, in a case where human driving force is decreasing and a value of the parameter is greater than or equal to the second predetermined value, decreases in the output of the motor are slowed more promptly than in a case where the value of the parameter is less than the second predetermined value. Thus, in a case where the travel load is large, increases in the load on the rider are limited.

In accordance with a fifth aspect of the present disclosure, the human-powered vehicle control device according to the fourth aspect is configured so that the electronic controller is configured to set the response speed for a case where the human driving force is decreasing to be lower as the value of the parameter increases.

With the human-powered vehicle control device according to the fifth aspect, the response speed for a case where human driving force is decreasing is set to be lower as the value of the parameter increases. Thus, as the travel load increases, decreases in the output of the motor are limited.

In accordance with a sixth aspect of the present disclosure, the human-powered vehicle control device according to any one of the first to fifth aspects is configured so that the electronic controller is configured to set the response speed for a case where the human driving force is increasing to be higher than the response speed for a case where the human driving force is decreasing.

With the human-powered vehicle control device according to the sixth aspect, in a case where human driving force is increasing, the output of the motor is promptly increased. In a case where human driving force is decreasing, decreases in the output of the motor are limited.

In accordance with a seventh aspect of the present disclosure, the human-powered vehicle control device according to any one of the first to sixth aspects is configured so that the electronic controller is configured to set the response speed for a predetermined period differently from the response speed for after the predetermined period elapses.

With the human-powered vehicle control device according to the seventh aspect, the response speed for until the predetermined time elapses and the response speed for after the predetermined time elapses are each set to an appropriate response speed.

In accordance with an eighth aspect of the present disclosure, the human-powered vehicle control device according to the seventh aspect is configured so that the electronic controller is configured to set the response speed for a case where the human driving force increases after the predetermined period elapses to be higher than the response speed for a case where the human driving force increases during the predetermined period.

With the human-powered vehicle control device according to the eighth aspect, in a case where human driving force increases after the predetermined period elapses, the output of the motor is increased more promptly than in a case where human driving force increases before the predetermined period elapses.

In accordance with a ninth aspect of the present disclosure, the human-powered vehicle control device according to the seventh or eighth aspect is configured so that the predetermined period is a period from when the motor starts to be driven until a first time elapses.

With the human-powered vehicle control device according to the ninth aspect, the response speed for a period from when the motor starts to be driven until the first time elapses and the response speed for after the first time elapses from the motor starts to be driven are each set to an appropriate response speed.

In accordance with a tenth aspect of the present disclosure, the human-powered vehicle control device according to the seventh or eighth aspect is configured so that the human-powered vehicle includes a crank to which the human driving force is input. The predetermined period is a period from when the motor starts to be driven until a rotation amount of the crank reaches a predetermined amount.

With the human-powered vehicle control device according to the tenth aspect, the response speed for a period from when the motor starts to be driven until the rotation amount of the crank reaches the predetermined amount and the response speed for after the rotation amount of the crank reaches the predetermined amount are each set to an appropriate response speed.

In accordance with an eleventh aspect of the present disclosure, the human-powered vehicle control device according to any one of the first to tenth aspect is configured so that the electronic controller includes a filter that performs a filtering process on a control command to the motor. The electronic controller is configured to change the response speed by varying a time constant included in the filter.

With the human-powered vehicle control device according to the eleventh aspect, the response speed is appropriately changed by varying the time constant included in the filter.

A human-powered vehicle control device according to a twelfth aspect of the present disclosure comprises an electronic controller that controls a motor assisting in propulsion of a human-powered vehicle. The electronic controller is configured to start driving the motor in accordance with operation of an operation portion and alter a changing speed of an output of the motor in accordance with a parameter. The parameter includes at least one of a travel resistance of the human-powered vehicle, a transmission ratio of the human-powered vehicle, a wheel size of the human-powered vehicle, an air resistance coefficient, a wind velocity, a rolling resistance coefficient, and a value related to a weight of a carried load of the human-powered vehicle.

With the human-powered vehicle control device according to the twelfth aspect, in a case where the motor starts to be driven in accordance with operation of the operation portion, the changing speed of the output of the motor is altered in accordance with the parameter, which affects the travel load.

In accordance with a thirteenth aspect of the present disclosure, the human-powered vehicle control device according to the twelfth aspect is configured so that the electronic controller is configured to increase the changing speed as a value of the parameter increases.

With the human-powered vehicle control device according to the thirteenth aspect, as the travel load increases, the output of the motor is promptly increased.

In accordance with a fourteenth aspect of the present disclosure, the human-powered vehicle control device according to the twelfth or thirteenth aspect is configured so that the electronic controller includes a filter that performs a filtering process on a control command to the motor. The electronic controller is configured to alter the changing speed by varying a time constant included in the filter.

With the human-powered vehicle control device according to the fourteenth aspect, the response speed is appropriately changed by varying the time constant included in the filter.

In accordance with a fifteenth aspect of the present disclosure, the human-powered vehicle control device according to any one of the first to fourteenth aspects is configured so that the travel resistance includes at least one of an air resistance, a rolling resistance of a wheel of the human-powered vehicle, a gradient resistance of a traveling road of the human-powered vehicle, and an acceleration resistance of the human-powered vehicle.

With the human-powered vehicle control device according to the fifteenth aspect, the motor is controlled in accordance with the travel resistance including at least one of an air resistance, a rolling resistance of a wheel of the human-powered vehicle, a gradient resistance of a traveling road of the human-powered vehicle, and an acceleration resistance of the human-powered vehicle.

In accordance with a sixteenth aspect of the present disclosure, the human-powered vehicle control device according to any one of the first to fifteenth aspects further comprises a detector that detects the parameter.

With the human-powered vehicle control device according to the sixteenth aspect, the parameter is appropriately detected by the detector.

The human-powered vehicle control device of the present disclosure appropriately controls the motor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

First Embodiment

A first embodiment of a human-powered vehicle control device 40 will now be described with reference to FIGS. 1 to 6. In the description hereafter, the human-powered vehicle control device 40 is simply referred to as the control device 40. The control device 40 is provided on a human-powered vehicle 10. The human-powered vehicle 10 is a vehicle that can be driven by at least human driving force. The human-powered vehicle 10 includes, for example, a bicycle. The number of wheels of the human-powered vehicle 10 is not limited. The human-powered vehicle 10 includes, for example, a monocycle and a vehicle having three or more wheels. The human-powered vehicle includes, for example, a mountain bike, a road bike, a city bike, a cargo bike, and a recumbent bike. In the embodiments described below, the human-powered vehicle 10 refers to a bicycle.

Figure 1:
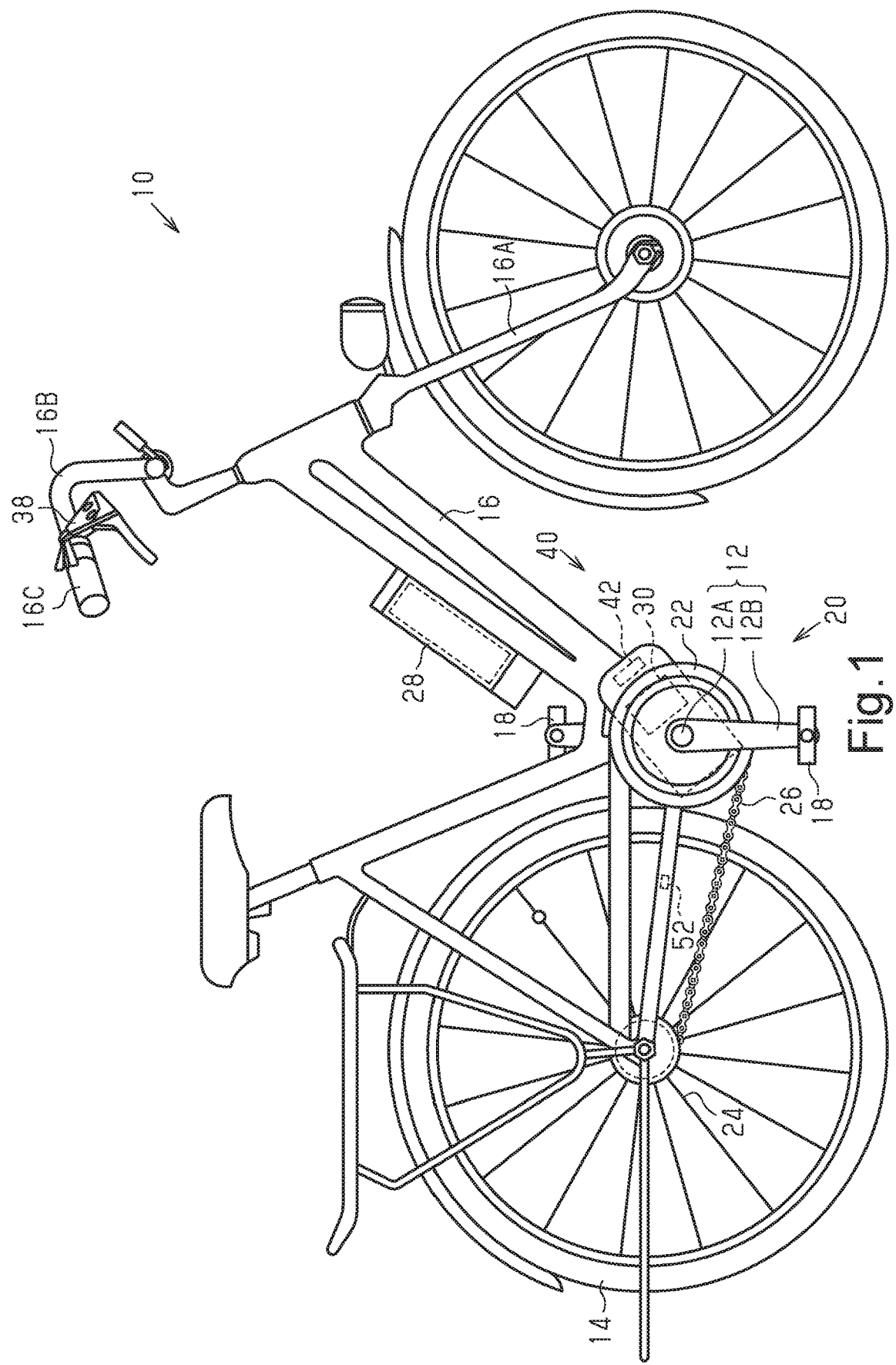
FIG. 1 is a side elevational view of a human-powered vehicle including a human-powered vehicle control device in accordance with a first embodiment.

As shown in FIG. 1, the human-powered vehicle 10 includes a crank 12. The human-powered vehicle 10 further includes a drive wheel 14 and a frame 16. Human driving force H is input to the crank 12. The crank 12 includes a crankshaft 12A that is rotatable relative to the frame 16 and a pair of crank arms 12B provided on opposite ends of the crankshaft 12A in the axial direction. A pedal 18 is coupled to each of the crank arms 12B. The drive wheel 14 is driven in accordance with rotation of the crank 12. The drive wheel 14 is supported by the frame 16. The crank 12 and the drive wheel 14 are coupled by a drive mechanism 20. The drive mechanism 20 includes a first rotary body 22 coupled to the crankshaft 12A. The crankshaft 12A and the first rotary body 22 can be coupled via a first one-way clutch. The first one-way clutch is configured to allow forward rotation of the first rotary body 22 in a case where the crank 12 rotates forward and prohibit rearward rotation of the first rotary body 22 in a case where the crank 12 rotates rearward. The first rotary body 22 includes a sprocket, a pulley, or a bevel gear. The drive mechanism 20 further includes a coupling member 26 and a second rotary body 24. The coupling member 26 transmits rotation force of the first rotary body 22 to the second rotary body 24. The coupling member 26 includes, for example, a chain, a belt, or a shaft.

The second rotary body 24 is coupled to the drive wheel 14. The second rotary body 24 includes a sprocket, a pulley, or a bevel gear. Preferably, a second one-way clutch is provided between the second rotary body 24 and the drive wheel 14. The second one-way clutch is configured to allow forward rotation of the drive wheel 14 in a case where the second rotary body 24 rotates forward and prohibit rearward rotation of the drive wheel 14 in a case where the second rotary body 24 rotates rearward.

The human-powered vehicle 10 includes a front wheel and a rear wheel. The front wheel is coupled to the frame 16 via a front fork 16A. A handlebar 16C is coupled to the front fork 16A via a stem 16B. In the embodiments described below, the drive wheel 14 refers to the rear wheel. However, the front wheel can be the drive wheel 14.

Figure 2:
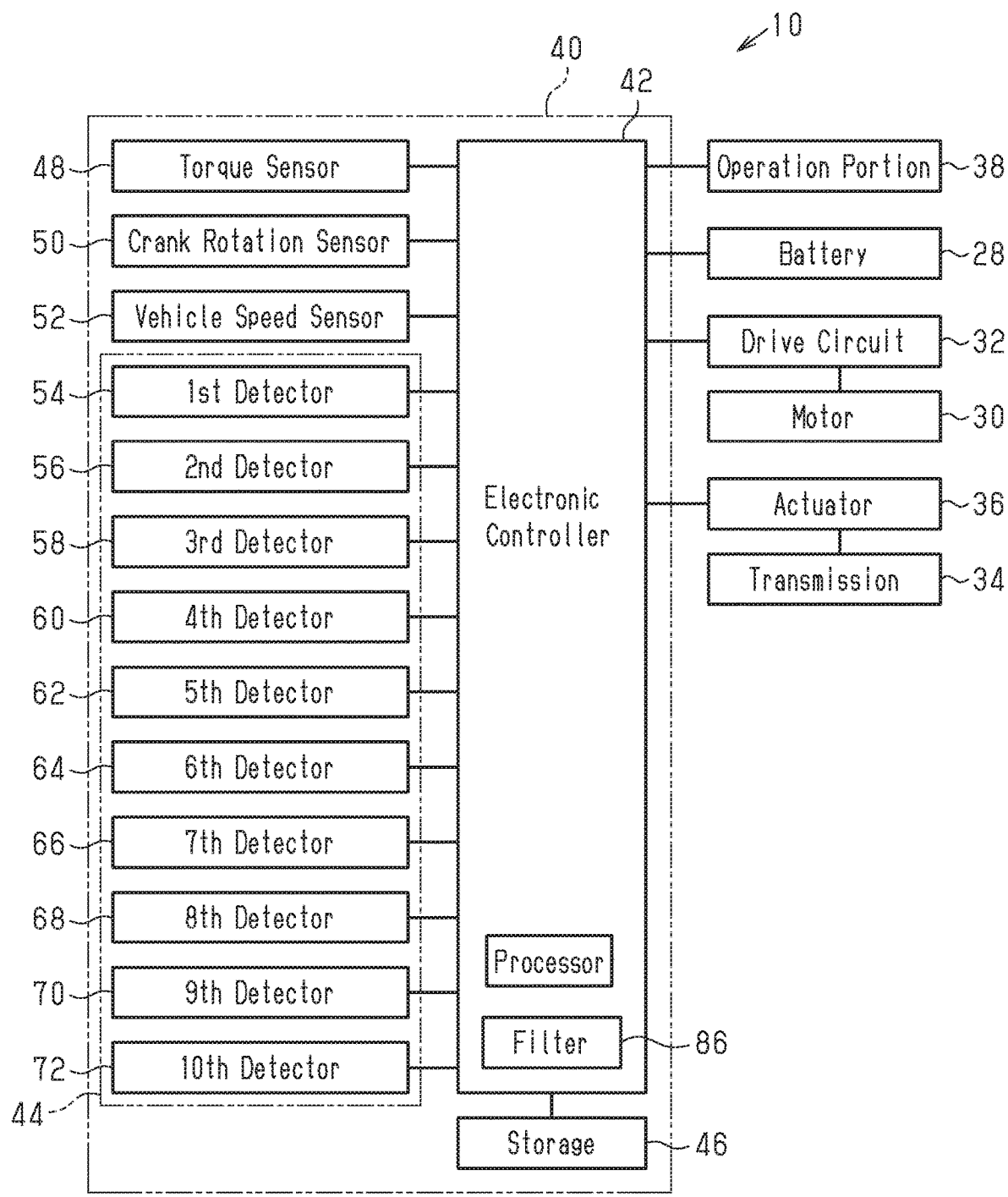
FIG. 2 is a block diagram showing the electric configuration of the human-powered vehicle control device of the first embodiment.

As shown in FIGS. 1 and 2, the human-powered vehicle 10 further includes a battery 28, a motor 30, a drive circuit 32 of the motor 30, a transmission 34, an actuator 36 of the transmission 34, and an operation portion 38.

The battery 28 includes one or more battery cells. The battery cell includes a rechargeable battery. The battery 28 supplies electric power to other electrical components that are provided on the human-powered vehicle 10 and electrically connected to the battery 28 by wires, such as the motor 30 and the control device 40. The battery 28 is connected to an electronic controller 42 through wired or wireless communication. The electronic controller 42 will simply be referred to as the controller 42. The battery 28 is configured to communicate with the controller 42, for example, through power line communication (PLC). The battery 28 can be attached to the exterior of the frame 16 or can be at least partially accommodated in the frame 16.

The motor 30 is configured to be a drive unit together with the drive circuit 32. Preferably, the motor 30 and the drive circuit 32 are provided on the same housing. The drive circuit 32 controls power supplied from the battery 28 to the motor 30. The drive circuit 32 is connected to the controller 42 of the control device 40 through wired or wireless communication. The drive circuit 32 is configured to communicate with the controller 42, for example, through serial communication. The drive circuit 32 drives the motor 30 in accordance with a control signal from the controller 42. The motor 30 assists propulsion of the human-powered vehicle 10. The motor 30 includes an electric motor. The motor 30 is provided to transmit rotation to the front wheel or a power transmission path of the human driving force H extending from the pedals 18 to the rear wheel. The motor 30 is provided on the frame 16 of the human-powered vehicle 10, the rear wheel, or the front wheel. In one example, the motor 30 is coupled to the power transmission path between the crankshaft 12A and the first rotary body 22. Preferably, a one-way clutch is provided on the power transmission path between the motor 30 and the crankshaft 12A so that in a case where the crankshaft 12A is rotated in a direction moving the human-powered vehicle 10 forward, the motor 30 will not be rotated by the rotation force of the crank 12. Elements other than the motor 30 and the drive circuit 32 can be provided on the housing on which the motor 30 and the drive circuit 32 are provided. For example, a speed reduction unit that reduces speed of rotation of the motor 30 and outputs the rotation can be provided on the housing.

The transmission 34 is configured to be a transmission device together with the actuator 36. The transmission 34 changes a transmission ratio B, that is, the ratio of rotational speed of the drive wheel 14 to rotational speed of the crank 12. The transmission 34 is configured to change the transmission ratio B of the human-powered vehicle 10. The transmission 34 is configured to change the transmission ratio B in a stepped manner. The actuator 36 causes the transmission 34 to perform a shifting operation. The transmission 34 is controlled by the controller 42. The actuator 36 is connected to the controller 42 through wired or wireless communication. The actuator 36 is configured to communicate with the controller 42, for example, through power line communication (PLC). The actuator 36 causes the transmission 34 to perform a shifting operation in accordance with a control signal from the controller 42. The transmission 34 includes at least one of an internal shifting device and an external shifting device (derailleur).

The operation portion 38 is operated to drive the motor 30. The operation portion 38 is connected to the controller 42 through wired or wireless communication. The operation portion 38 is configured to communicate with the controller 42, for example, through power line communication (PLC). Each operation portion 38 includes, for example, an operating member, a sensor detecting movement of the operating member, and an electrical circuit communicating with the controller 42 in accordance with an output signal of the sensor. The operation portion 38 transmits an output signal to the controller 42 in accordance with an operation performed on the operating member by the user. The operating member and the sensor, which detects movement of the operating member, are configured to include a push switch, a lever-type switch, or a touchscreen.

As shown in FIG. 2, the control device 40 includes the controller 42. In the present embodiment, the control device 40 further includes a detector 44. The term "detector" as used herein refers to hardware device and does not include a human. In the present embodiment, the control device 40 further includes a storage 46. In the present embodiment, the control device 40 further includes a torque sensor 48, a crank rotation sensor 50, and a vehicle speed sensor 52.

The terms "controller" and "electronic controller" as used herein refer to hardware that executes a software program and does not include a human. The controller 42 includes an arithmetic processor that executes predetermined control programs. The arithmetic processor includes, for example, a central processing unit (CPU) or a micro processing unit (MPU). The controller 42 can include one or more microcomputers with one or more processors. The controller 42 can include multiple arithmetic processors separately located at different positions. The storage 46 stores information used in various control programs and various control processes. The storage 46 includes any computer storage device or any non-transitory computer-readable medium with the sole exception of a transitory, propagating signal. For example, the storage 54 includes a nonvolatile memory and a volatile memory. The controller 42 and the storage 46 are provided, for example, on the housing on which the motor 30 is provided. The controller 42 can include the drive circuit 32.

The torque sensor 48 is provided on the housing on which the motor 30 is provided. The torque sensor 48 is used to detect torque TH of the human driving force H that is input to the crank 12. The torque sensor 48 can be any suitable torque sensor that can produce a signal that is indicative of a torque of the human driving force H. For example, in a case where the first one-way clutch is provided on the power transmission path, the torque sensor 48 is provided at an upstream side of the first one-way clutch. The torque sensor 48 includes, for example, a strain sensor or a magnetostriction sensor. The strain sensor includes a strain gauge. In a case where the torque sensor 48 includes a strain sensor, it is preferred that the strain sensor be provided on the outer circumferential portion of the rotary body included in the power transmission path. The torque sensor 48 can include a wireless or wired communication unit. The communication unit of the torque sensor 48 is configured to perform communication with the controller 42.

The crank rotation sensor 50 is used to detect rotational speed N of the crank 12. The crank rotation sensor 50 can be any suitable crank rotation sensor that can produce a signal that is indicative of a rotational speed N of the crank 12 of the human-powered vehicle 10. The crank rotation sensor 50 is attached to the frame 16 of the human-powered vehicle 10 or the housing on which the motor 30 is provided. The crank rotation sensor 50 is configured to include a magnetic sensor outputting a signal corresponding to strength of a magnetic field. An annular magnet having a magnetic field, the strength of which changes in the circumferential direction, is provided on the crankshaft 12A or the power transmission path between the crankshaft 12A and the first rotary body 22. The crank rotation sensor 50 is connected to the controller 42 through wired or wireless communication. The crank rotation sensor 50 outputs a signal corresponding to the rotational speed N of the crank 12 to the controller 42. The crank rotation sensor 50 can be provided on a member that rotates integrally with the crankshaft 12A in the power transmission path of the human driving force H between the crankshaft 12A and the first rotary body 22. For example, in a case where a one-way clutch is not provided between the crankshaft 12A and the first rotary body 22, the crank rotation sensor 50 can be provided on the first rotary body 22.

The vehicle speed sensor 52 is used to detect a vehicle speed V of the human-powered vehicle 10. The vehicle speed sensor 52 detects rotational speed of a wheel. The vehicle speed sensor 52 can be any suitable vehicle speed sensor. The vehicle speed sensor 52 is electrically connected to the controller 42 through wired or wireless communication. The vehicle speed sensor 52 is connected to the controller 42 through wired or wireless communication. The vehicle speed sensor 52 outputs a signal corresponding to rotational speed of the wheel to the controller 42. The controller 42 calculates the vehicle speed V of the human-powered vehicle 10 based on the rotational speed of the wheel. In a state where the vehicle speed V is greater than or equal to a predetermined value, the controller 42 stops the motor 30. The predetermined value is, for example, 25 km/hour or 45 km/hour. Preferably, the vehicle speed sensor 52 includes a magnetic reed configured to be a reed switch or a Hall element. The vehicle speed sensor 52 can be attached to a chainstay of the frame 16 and configured to detect a magnet attached to the rear wheel or can be provided on the front fork 16A and configured to detect a magnet attached to the front wheel. Thus, in the case of a reed switch or a Hall element, the vehicle speed sensor 52 indirectly detects the rotational speed of the wheel by detecting a magnet attached to the wheel. In another example, the vehicle speed sensor 52 includes a GPS receiver. The controller 42 can detect the vehicle speed V of the human-powered vehicle 10 in accordance with the GPS information acquired by the GPS receiver, the map information recorded in advance in the storage 46, and the time. The controller 42 preferably includes a time measurement circuit for measuring time. Alternatively, the vehicle speed sensor 42 can directly detect the rotational speed of the wheel by using a speedometer gear assembly that is directly rotated by the wheel.

The controller 42 is configured to control the motor 30 in accordance with the human driving force H input to the human-powered vehicle 10. The controller 42 drives the motor 30. For example, in a case where the operation portion 38 is operated to start driving the motor 30 and the human driving force H is greater than or equal to a predetermined value, the controller 42 starts driving the motor 30.

The controller 42 controls the motor 30, for example, so that the ratio of assist force of the motor 30 to the human driving force H is set to a predetermined ratio. The controller 42 can control the motor 30, for example, so that the ratio of power WM (watt) of the motor 30 to power WH (watt) of the human driving force H is set to the predetermined ratio. The controller 42 controls the motor 30 in multiple control modes that differ from each other in a ratio Y of output of the motor 30 to the human driving force H. The ratio Y can refer to a ratio YA of the power WM of output of the motor 30 to the power WH of the human driving force H of the human-powered vehicle 10. The power WH of the human driving force H is obtained by multiplying the human driving force H and the rotational speed N of the crank 12. The controller 42 can control the motor 30 so that the ratio of output torque TM of assist force of the motor 30 to the torque TH of the human driving force H of the human-powered vehicle 10 is set to a predetermined ratio. The ratio Y can refer to a torque ratio YB of the output torque TM of the motor 30 to the torque TH of the human driving force H of the human-powered vehicle 10. In a case where output of the motor 30 is input via a speed reduction unit to the power path of the human driving force H, the output of the speed reduction unit is used as the output of the motor 30. The controller 42 outputs a control command to the drive circuit 32 of the motor 30 in accordance with the power WH or the torque TH of the human driving force H. The control command includes, for example, a torque command value.

The controller 42 controls the motor 30 so that output of the motor 30 is set to be less than or equal to a predetermined value. The output of the motor 30 includes the output torque TM of the motor 30. The controller 42 can control the motor 30 so that the ratio YA is set to be less than or equal to a predetermined value YA1. In one example, the predetermined value YA1 is 500 watts. In another example, the predetermined value YA1 is 300 watts. The controller 42 can control the motor 30 so that the torque ratio YB is set to be less than or equal to a predetermined torque ratio YB1. In one example, the predetermined torque ratio YB1 is 300%.

The detector 44 is used to detect a parameter P. The parameter P includes at least one of a travel resistance R of the human-powered vehicle 10, the torque TH of the human driving force H, the transmission ratio B of the human-powered vehicle 10, a wheel size of the human-powered vehicle 10, an air resistance coefficient C, a value related to a front surface projection area A of the rider of the human-powered vehicle 10, a wind velocity Va, a rolling resistance coefficient M, a value related to the weight of a carried load of the human-powered vehicle 10, and an acceleration a of the human-powered vehicle 10. The travel resistance R includes at least one of an air resistance R1, a rolling resistance R2 of a wheel of the human-powered vehicle 10, a gradient resistance R3 of a traveling road of the human-powered vehicle 10, and an acceleration resistance R4 of the human-powered vehicle 10.

The detector 44 includes at least one of a first detector 54, a second detector 56, a third detector 58, a fourth detector 60, a fifth detector 62, a sixth detector 64, a seventh detector 66, an eighth detector 68, a ninth detector 70, and a tenth detector 72. The detector 44 is connected to the controller 42 through wired or wireless communication. The detector 44 is configured to perform communication with the controller 42, for example, through power line communication (PLC).

Figure 3:
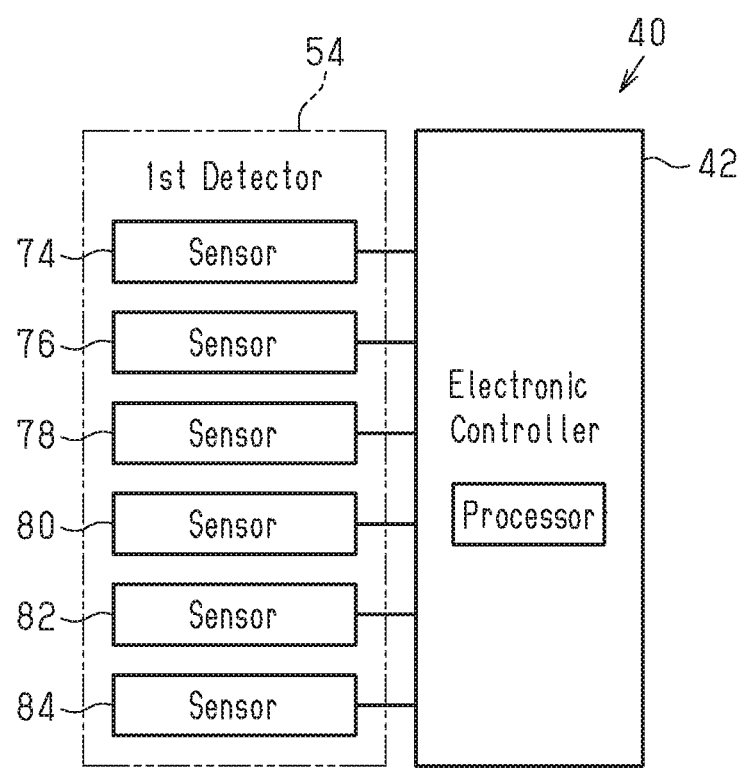
FIG. 3 is a block diagram showing the electric configuration of the first detector and the electronic controller shown in FIG. 2.

The first detector 54 is used to detect the travel resistance R. As shown in FIG. 3, the first detector 54 further includes a wind sensor 74, an acceleration sensor 76, a vehicle speed sensor 78, an inclination sensor 80, an image sensor 82, and a load sensor 84.

The wind sensor 74 is used to detect at least one of a wind velocity and a wind pressure. The wind sensor 74 includes one of a wind velocity sensor and a wind pressure sensor. The wind sensor 60 can any wind sensor that can produce a signal that is indicative at least one of a wind speed and a wind pressure. The wind sensor 74 is provided, for example, on the handlebar 16C of the human-powered vehicle 10. Preferably, the wind sensor 74 is configured to detect at least one of a headwind and a tailwind in a case where the human-powered vehicle 10 travels forward.

The acceleration sensor 76 is used to detect the acceleration "a" in a direction in which the human-powered vehicle 10 moves forward. The acceleration sensor 76 includes any suitable acceleration sensor that can produce a signal that is indicative of a forward acceleration of the human-powered vehicle 10. The acceleration sensor 75 can be included in a gyroscope. The acceleration sensor 76 outputs a signal corresponding to the acceleration a in a direction in which the human-powered vehicle 10 moves forward to the controller 42.

The vehicle speed sensor 78 is used to detect the vehicle speed V of the human-powered vehicle 10. The vehicle speed sensor 78 is configured in the same manner as the vehicle speed sensor 52. The vehicle speed sensor 52 can be used as the vehicle speed sensor 78. The vehicle speed sensor 78 and the vehicle speed sensor 52 can have separate configurations.

The inclination sensor 80 is used to detect an inclination of the human-powered vehicle 10. The inclination sensor 80 is configured to detect an inclination angle D of the road surface on which the human-powered vehicle 10 travels. The inclination angle D of the road surface on which the human-powered vehicle 10 travels is detected with the inclination angle of the human-powered vehicle 10 in the forward direction. The inclination angle D of the road surface on which the human-powered vehicle 10 travels corresponds to the inclination angle of the human-powered vehicle 10. The inclination sensor 80 includes any suitable inclination sensor that can produce a signal that is indicative an inclination of the human-powered vehicle 10. One example of the inclination sensor 80 is a gyroscope or an acceleration sensor. In another example, the inclination sensor 80 includes a global positioning system (GPS) receiver. The controller 42 can calculate the inclination angle D of the road surface on which the human-powered vehicle 10 travels based on GPS information that is obtained by the GPS receiver and a road gradient included in map information that is stored in the storage 46 in advance. The inclination angle D includes a pitch angle of the human-powered vehicle 10.

The image sensor 82 is configured to detects the front surface projection area A of at least one of the human-powered vehicle 10 and the rider. The image sensor 82 includes any suitable image sensor that can produce a signal that is indicative of a front projection area A of at least one of the human-powered vehicle 10 and the rider. The image sensor 82 is provided, for example, on the handlebar 16C of the human-powered vehicle 10 to capture an image of the rider of the human-powered vehicle 10. The image sensor 82 outputs image data of at least one of the human-powered vehicle 10 and the rider to the controller 42. The controller 42 calculates the front surface projection area A of at least one of the human-powered vehicle 10 and the rider based on the image data received from the image sensor 82.

The load sensor 84 is used to detect the value related to the weight of the carried load of the human-powered vehicle 10. The load sensor 84 detects the weight of the carried load of the human-powered vehicle 10. The load sensor 84 can be any suitable load sensor that can produce a signal that is indicative of the weight of the carried load of the human-powered vehicle 10. The load sensor 84 is provided, for example, on the axle of at least one of the front wheel and the rear wheel. In this case, preferably, the load sensor 84 is provided on each of the front wheel and the rear wheel. For example, in a state where the human-powered vehicle 10 is lifted from the ground, a signal output from the load sensor 84 is set to correspond to weight being zero (gram-force). This allows detection of a total weight m of the human-powered vehicle 10 and the carried load. Also, for example, in a state where the rider is not riding the human-powered vehicle 10, a signal output from the load sensor 84 is set to correspond to weight being zero (gram-force). This allows detection of the weight of the rider of the human-powered vehicle 10. Preferably, the storage 46 stores a relationship between information output from the load sensor 84 and weight. The load sensor 84 includes a pressure sensor or a strain sensor. The load sensor 84 can detect, for example, force applied to a saddle of the human-powered vehicle 10. In this case, the load sensor 84 can detect the weight of the rider. The load sensor 84 can detect, for example, air pressure of a tire of the human-powered vehicle 10. The controller 42 calculates the weight of a carried load using the air pressure of the tire. Instead of the load sensor 84, an input portion can be provided on the control device 40 to input information related to the weight of the carried load to the controller 42. It is preferred that in a case where information related to the weight of the rider is input via the input portion, the controller 42 store the information related to the weight of the rider in the storage 46. The information related to the carried load includes, for example, the weight of the rider. The storage 46 stores information related to the weight of the human-powered vehicle 10. The controller 42 can add the weight of the human-powered vehicle 10 and the weight of the carried load to calculate the total weight m of the human-powered vehicle 10 and the carried load.

The controller 42 calculates the travel resistance R based on an output of the first detector 54 and information stored in the storage 46. The travel resistance R includes at least one of the air resistance R1, the rolling resistance R2 of the wheel of the human-powered vehicle 10, the gradient resistance R3 of the traveling road of the human-powered vehicle 10, and the acceleration resistance R4 of the human-powered vehicle 10. The travel resistance R is calculated based on at least one of the air resistance R1, the rolling resistance R2 of the wheel of the human-powered vehicle 10, the gradient resistance R3 of the travel road of the human-powered vehicle 10, and the acceleration resistance R4 of the human-powered vehicle 10. In one example, the controller 42 calculates the travel resistance R based on all of the air resistance R1, the rolling resistance R2, the gradient resistance R3, and the acceleration resistance R4.

In a case where the controller 42 calculates the travel resistance R based on all of the air resistance R1, the rolling resistance R2, the gradient resistance R3, and the accelera-tion resistance R4, the travel resistance R is obtained, for example, from equation (1). The air resistance R1 is obtained, for example, from equation (2). The rolling resistance R2 of the wheel of the human-powered vehicle 10 is obtained from equation (3). The gradient resistance R3 of the traveling road of the human-powered vehicle 10 is obtained from equation (4). The acceleration resistance R4 of the human-powered vehicle 10 is obtained from equation (5).

$$R = R1 + R2 + R3 + R4 \tag{1}$$

$$R1 = C \times A \times (V - Va)2 \tag{2}$$

$$R2 = M \times m \times g \tag{3}$$

$$R3 = m \times g \times \sin D \tag{4}$$

$$R4 = m \times a \tag{5}$$

The air resistance coefficient of at least one of the human-powered vehicle 10 and the rider is denoted by "C." The air resistance coefficient C can be an appropriate fixed value stored in the storage 46 in advance or can be input by the rider using the operation portion 38 or the like.

The front surface projection area is denoted by "A." The front surface projection area A can be detected by the image sensor 82, can be an appropriate fixed value that is stored in the storage 46 in advance, or can be input by the rider using the operation portion 38 or the like.

The wind velocity detected by the wind sensor 74 is denoted by "Va." The wind velocity Va has a negative value in a case where a headwind blows against the human-powered vehicle 10. In a case where the detector is installed to face in the forward direction so that the wind sensor 74 detects a headwind in a direction in which the human-powered vehicle 10 moves forward, the wind sensor 74 outputs a signal corresponding to V-Va. The wind velocity Va can be detected by the wind sensor 74, can be an appropriate fixed value that is stored in the storage 46 in advance, or can be input by the rider using the operation portion 38 or the like.

The rolling resistance coefficient of the tire of the human-powered vehicle 10 is denoted by "M." The rolling resistance coefficient M can be an appropriate fixed value that is stored in the storage 46 in advance or can be input by the rider using the operation portion 38 or the like.

The total weight of the human-powered vehicle 10 and the carried load is denoted by "m." The total weight m can be detected using the load sensor 84, can be an appropriate fixed value that is stored in the storage 46 in advance, or can be input by the rider using the operation portion 38 or the like.

The gravity acceleration of the human-powered vehicle 10 is denoted by "g." The inclination angle of the road surface on which the human-powered vehicle 10 travels is denoted by "D." The inclination angle D can be detected by the inclination sensor 80, can be an appropriate fixed value that is stored in the storage 46 in advance, or can be input by the rider using the operation portion 38 or the like.

The acceleration of the human-powered vehicle 10 is denoted by "a." The acceleration a can be detected by the acceleration sensor 76, can be an appropriate fixed value that is stored in the storage 46 in advance, or can be input by the rider using the operation portion 38 or the like.

The second detector 56 shown in FIG. 2 is used to detect the torque TH of the human driving force H. The second detector 56 is configured in the same manner as the torque sensor 48. The torque sensor 48 can be used as the second detector 56. The second detector 56 and the torque sensor 48 can have separate configurations. The controller 42 calculates the torque TH of the human driving force H based on an output of the second detector 56 and information stored in the storage 46.

The third detector 58 is used to detect the transmission ratio B of the human-powered vehicle 10. The third detector 58 detects the operation state of the transmission 34. Preferably, the third detector 58 includes a transmission sensor configured to detect the transmission ratio B. The transmission sensor detects the present shift stage of the transmission 34. The third detector 58 can detect at least one of an operation of the operation portion 38 that operates the transmission 34 and a signal of the controller 42 that controls the transmission 34. The controller 42 calculates the transmission ratio B based on an output of the third detector 58 and information stored in the storage 46. The relationship between the shift stage and the transmission ratio B is, for example, stored in the storage 46 in advance. This allows the controller 42 to detect the present transmission ratio B from the detection result of the transmission sensor. The controller 42 can calculate the transmission ratio B from rotational speed of the drive wheel 14 and the rotational speed N of the crank 12. In this case, the storage 46 stores information related to the circumferential length of the drive wheel 14, the diameter of the drive wheel 14, or the radius of the drive wheel 14 in advance.

The fourth detector 60 is used to detect the wheel size of the human-powered vehicle 10. The fourth detector 60 includes, for example, a sensor detecting air pressure of a tire. The fourth detector 60 can be provided on a valve provided on the rim of a wheel. Preferably, the fourth detector 60 includes a sensor that outputs a signal corresponding to air pressure of the inside of the tire and a wireless transmitter that transmits the signal to the controller 42 from the sensor through wireless communication. Preferably, the fourth detector 60 is provided on the drive wheel 14 and can be provided on each of the front wheel and the rear wheel. With reference to a case where the air pressure of the tire is a predetermined air pressure, in a case where the air pressure of the tire is lower than the predetermined air pressure, the controller 42 determines that the wheel size of the human-powered vehicle 10 is smaller than a reference value. In a case where the air pressure of the tire is higher than the predetermined air pressure, the controller 42 determines that the wheel size of the human-powered vehicle 10 is larger than the reference value. The storage 46 can store information showing the relationship between the air pressure of a tire and the wheel size of the human-powered vehicle 10. In this case, the controller 42 can calculate the wheel size of the human-powered vehicle 10 from the information showing the relationship with the wheel size of the human-powered vehicle 10 stored in the storage 46 and the air pressure of the tire detected by the fourth detector 60.

The fifth detector 62 is used to detect the air resistance coefficient C. The fifth detector 62 is configured in the same manner as the image sensor 82. The image sensor 82 can be used as the fifth detector 62. The fifth detector 62 and the image sensor 82 can have separate configurations. With reference to a case where the front surface projection area A is a predetermined area, in a case where the front surface projection area A is smaller than the predetermined area, the controller 42 determines that the air resistance coefficient C is smaller than a reference value. In a case where the front surface projection area A is larger than the predetermined area, the controller 42 determines that the air resistance coefficient C is larger than the reference value. The storage 46 can store information showing the relationship between the air resistance coefficient C and the front surface projection area A. In this case, the controller 42 can calculate the value of the air resistance coefficient C from the information showing the relationship between the air resistance coefficient C and the front surface projection area A stored in the storage 46 and the front surface projection area A detected by the fifth detector 62.

The sixth detector 64 is used to detect a value related to the front surface projection area A of the rider of the human-powered vehicle 10. The sixth detector 64 is configured in the same manner as the image sensor 82. The image sensor 82 can be used as the sixth detector 64. The sixth detector 64 and the image sensor 82 can have separate configurations. The controller 42 calculates the value related to the front surface projection area A based on an output of the sixth detector 64 and information stored in the storage 46.

The seventh detector 66 is used to detect the wind velocity Va. The seventh detector 66 is configured in the same manner as the wind sensor 74. The wind sensor 74 can be used as the seventh detector 66. The seventh detector 66 and the wind sensor 74 can have separate configurations. The controller 42 calculates the wind velocity Va based on an output of the seventh detector 66 and information stored in the storage 46.

The eighth detector 68 is used to detect the rolling resistance coefficient M. The eighth detector 68 is configured in the same manner as the vehicle speed sensor 52. The vehicle speed sensor 52 can be used as the fifth detector 62. The fifth detector 62 and the vehicle speed sensor 52 can have separate configurations. With reference to a case where the vehicle speed V is a predetermined speed, the controller 42 increases the rolling resistance coefficient M in a case where the vehicle speed V is increased and decreases the rolling resistance coefficient M in a case where the vehicle speed V is decreased. For example, the storage 46 stores the rolling resistance coefficient M for a case where the vehicle speed V is the predetermined speed. For example, the controller 42 corrects the rolling resistance coefficient M so that the rolling resistance coefficient M increases as the vehicle speed V is increased. The controller 42 corrects the rolling resistance coefficient M, for example, by multiplying the rolling resistance coefficient M by a correction coefficient that increases as the vehicle speed V is increased. Preferably, the storage 46 stores the relationship between the vehicle speed V and the correction coefficient of the rolling resistance coefficient M.

The ninth detector 70 is used to detect a value related to the weight of a carried load of the human-powered vehicle 10. The ninth detector 70 is configured in the same manner as the load sensor 84. The load sensor 84 can be used as the ninth detector 70. The ninth detector 70 and the load sensor 84 can have separate configurations. The controller 42 calculates the weight of the carried load based on an output of the ninth detector 70 and information stored in the storage 46.

The tenth detector 72 is used to detect the acceleration a of the human-powered vehicle 10. The tenth detector 72 is configured in the same manner as the acceleration sensor 76. The acceleration sensor 76 can be used as the tenth detector 72. The tenth detector 72 and the acceleration sensor 76 can have separate configurations. The controller 42 calculates the acceleration a of the human-powered vehicle 10 based on an output of the tenth detector 72 and information stored in the storage 46.

The controller 42 changes a response speed Q of the motor 30 with respect to a change in the human driving force H in accordance with the parameter P. For example, the controller 42 changes a changing amount of the output torque TM of the motor 30 per unit time with respect to a changing amount of the torque TH of the human driving force H per unit time. Preferably, the controller 42 includes a filter 86 that performs a filtering process on a control command to the motor 30. The controller 42 changes the response speed Q, for example, by varying a time constant included in the filter 86. The filter 86 includes, for example, a low-pass filter. Additionally, after the filter 86 performs the filtering process on a control command, the controller 42 can change the response speed Q by setting gain that changes in accordance with time or a rotation angle of the crank 12 for the control command.

The controller 42 sets a response speed Q1 for a case where the human driving force H is increasing to be higher than a response speed Q2 for a case where the human driving force H is decreasing. The controller 42 sets the response speed Q1 for a case where the human driving force H is increasing to be higher as the value of the parameter P increases. The controller 42 sets the response speed Q2 for a case where the human driving force H is decreasing to be lower as the value of the parameter P increases. The response speed Q1 for a case where the human driving force H is increasing includes a response speed Q11 for a case where the value of the parameter P is less than a first predetermined value P1 and a response speed Q12 for a case where the value of the parameter P is greater than or equal to the first predetermined value P1. The response speed Q2 for a case where the human driving force H is decreasing includes a response speed Q21 for a case where the value of the parameter P is less than a second predetermined value P2 and a response speed Q22 for a case where the value of the parameter P is greater than or equal to the second predetermined value P2.

The controller 42 sets the response speed Q11 for a case where the human driving force H is increasing and the value of the parameter P is greater than or equal to the first predetermined value P1 to be higher than the response speed Q12 for a case where the human driving force H is increasing and the value of the parameter P is less than the first predetermined value P1. In the description hereafter, the response speed Q11 is referred to as the first response speed Q11, and the response speed Q12 is referred to as the second response speed Q12.

The controller 42 sets the response speed Q21 for a case where the human driving force H is decreasing and the value of the parameter P is greater than or equal to the second predetermined value P2 to be lower than the response speed Q22 for a case where the human driving force H is decreasing and the value of the parameter P is less than the second predetermined value P2. The second predetermined value P2 can differ from or be equal to the first predetermined value P1. In the description hereafter, the response speed Q21 is referred to as the third response speed Q21, and the response speed Q22 is referred to as the fourth response speed Q22.

Figure 4:
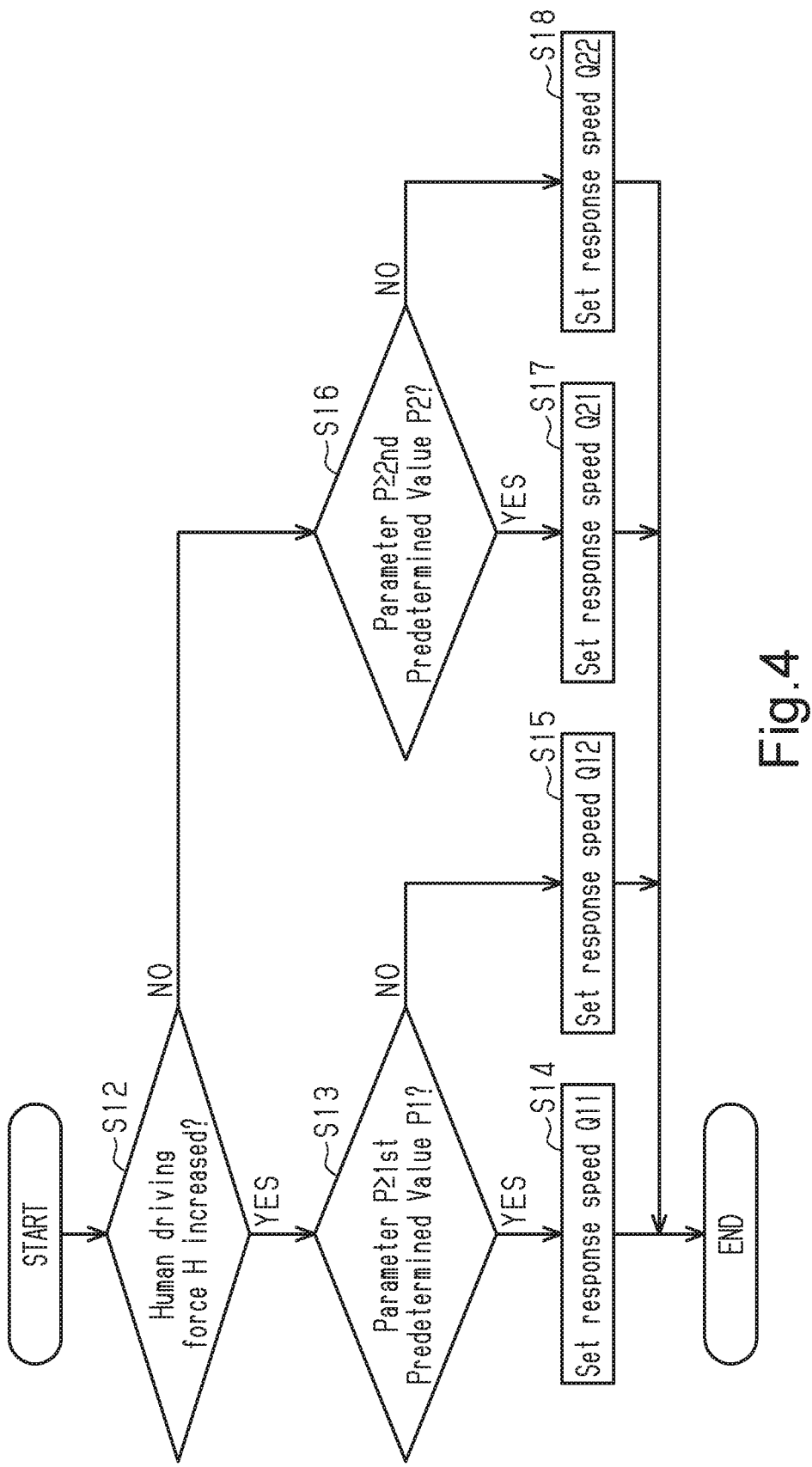
FIG. 4 is a flowchart of a process performed by the electronic controller shown in FIG. 2 to set a response speed.

The process for setting the filter 86 will now be described with reference to FIG. 4. In a case where the controller 42 is supplied with power from the battery 28, the controller 42 starts the process and proceeds to step S12 of the flowchart shown in FIG. 4. As long as the controller 42 is supplied with power and the assist function of the motor 30 is not deactivated, the process is executed from step S12 in predetermined cycles.

In step S12, the controller 42 determines whether or not the human driving force H is increasing. In a case where the controller 42 determines that the human driving force H is increasing, the controller 42 proceeds to step S13. More specifically, in a case where the human driving force H of the present control cycle is greater than the human driving force H of the preceding control cycle, the controller 42 determines that the human driving force H is increasing.

In step S13, the controller 42 determines whether or not the value of the parameter P is greater than or equal to the first predetermined value P1. In a case where the controller 42 determines that the value of the parameter P is greater than or equal to the first predetermined value P1, the controller 42 proceeds to step S14. The controller 42 determines that the value of the parameter P is greater than or equal to the first predetermined value P1 in a case where at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10 is greater than or equal to a first predetermined value that is set for each parameter. For example, in a case where the controller 42 determines that the travel resistance R is greater than or equal to a first travel resistance RA, the controller 42 proceeds to step S14.

In step S14, the controller 42 sets the filter 86 so that the response speed Q is the first response speed Q11 and ends the process. The controller 42 sets, for example, a time constant corresponding to the first response speed Q11 in the filter 86.

In a case where the controller 42 determines in step S13 that the value of the parameter P is not greater than or equal to the first predetermined value P1, the controller 42 proceeds to step S15. In step S15, the controller 42 sets the filter 86 so that the response speed Q is the second response speed Q12 and ends the process. The controller 42 sets, for example, a time constant corresponding to the second response speed Q12 in the filter 86.

In a case where the controller 42 determines in step S12 that the human driving force H is not increasing, the controller 42 proceeds to step S16. In step S16, the controller 42 determines whether or not the value of the parameter P is greater than or equal to the second predetermined value P2. In a case where the controller 42 determines that the value of the parameter P is greater than or equal to the second predetermined value P2, the controller 42 proceeds to step S17. The controller 42 determines that the value of the parameter P is greater than or equal to the second predetermined value P2 in a case where at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10 is greater than or equal to a second predetermined value P2 that is set for each parameter. For example, in a case where the controller 42 determines that the travel resistance R is greater than or equal to a second travel resistance RB, the controller 42 proceeds to step S17.

In step S17, the controller 42 sets the filter 86 so that the response speed Q is the third response speed Q21 and ends the process. The controller 42 sets, for example, a time constant corresponding to the third response speed Q21 in the filter 86.

In a case where the controller 42 determines in step S16 that the value of the parameter P is not greater than or equal to the second predetermined value P2, the controller 42 proceeds to step S18. In step S18, the controller 42 sets the filter 86 so that the response speed Q is the fourth response speed Q22 and ends the process. The controller 42 sets, for example, a time constant corresponding to the fourth response speed Q22 in the filter 86.

The controller 42 sets the response speed Q for a predetermined period TX differently from the response speed Q for after the predetermined period TX elapses. The controller 42 sets the response speed Q for a case where the human driving force H increases after the predetermined period TX elapses to be higher than the response speed Q for a case where the human driving force H increases during the predetermined period TX. The predetermined period TX is a period from when the motor 30 starts to be driven until a first time t11 elapses.

Figure 5:
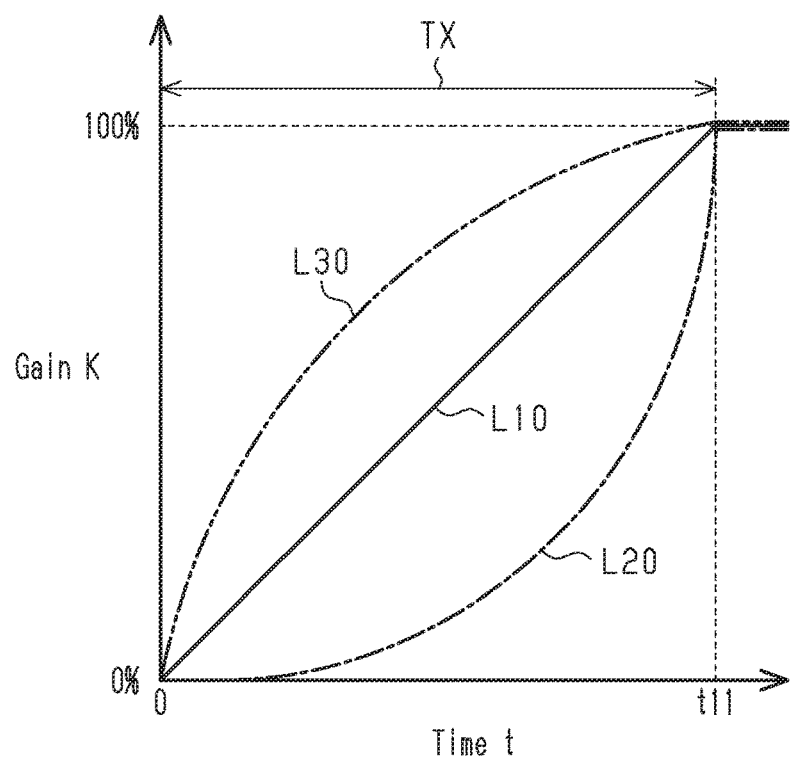
FIG. 5 is a map showing a first example of a relationship between time and gain stored in the storage shown in FIG. 2.

In the present embodiment, after the filter 86 performs the filtering process on a control command, the controller 42 changes the response speed Q by setting gain K that changes in accordance with time t shown in FIG. 5 for the control command. FIG. 5 is a graph showing the relationship between gain K and time t from when the motor 30 starts to be driven. The relationship between gain K and time t from when the motor 30 starts to be driven is stored in the storage 46 as a table, a relational expression, or a map. When the motor 30 starts to be driven, as shown in FIG. 5, gain K gradually increases from zero (0) as time t elapses. Gain K becomes 100% at the first time t11. Subsequently, gain K maintains 100% until the driving of the motor 30 stops. The controller 42 changes the response speed Q by outputting the control command on which the filter 86 has performed the filter process at a rate of gain K. Through the process, the controller 42 sets the response speed Q for the predetermined period TX differently from the response speed Q for after the predetermined period TX elapses. With the combination of the process shown in FIG. 4, the response speed Q for a case where the human driving force H increases after the predetermined period TX elapses is set to be higher than the response speed Q for a case where the human driving force H increases during the predetermined period TX. The relationship between time t and gain K can linearly change as indicated by the solid line L10 shown in FIG. 5 or can change in a curved manner as indicated by the single-dashed line L20 and the double-dashed line L30 shown in FIG. 5.

Figure 6:
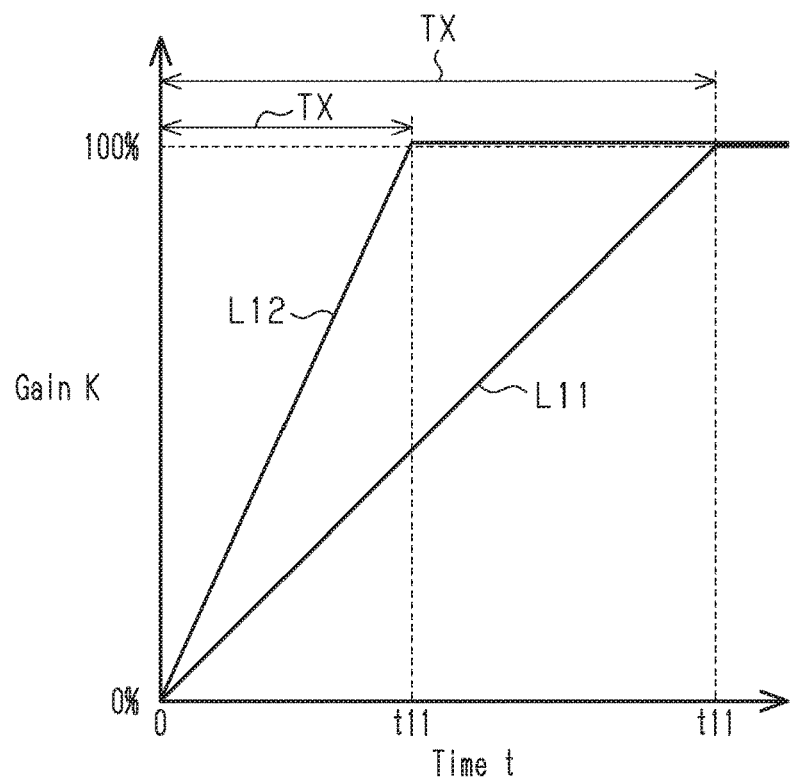
FIG. 6 is a map showing a second example of a relationship between time and gain stored in the storage shown in FIG. 2.

The relationship between gain K and time t from when the motor 30 starts to be driven can be changed in accordance with at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10. For example, the predetermined period TX can be shortened as at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10 increases. For example, the solid line L11 shown in FIG. 6 shows the relationship between gain K and time t from when the motor 30 starts to be driven in a case where at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10 is less than or equal to a third predetermined value P3 that is set for each parameter. For example, the solid line L12 shown in FIG. 6 shows the relationship between gain K and time t from when the motor 30 starts to be driven in a case where at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10 is greater than the third predetermined value P3 set for each parameter.

Second Embodiment

Figure 7:
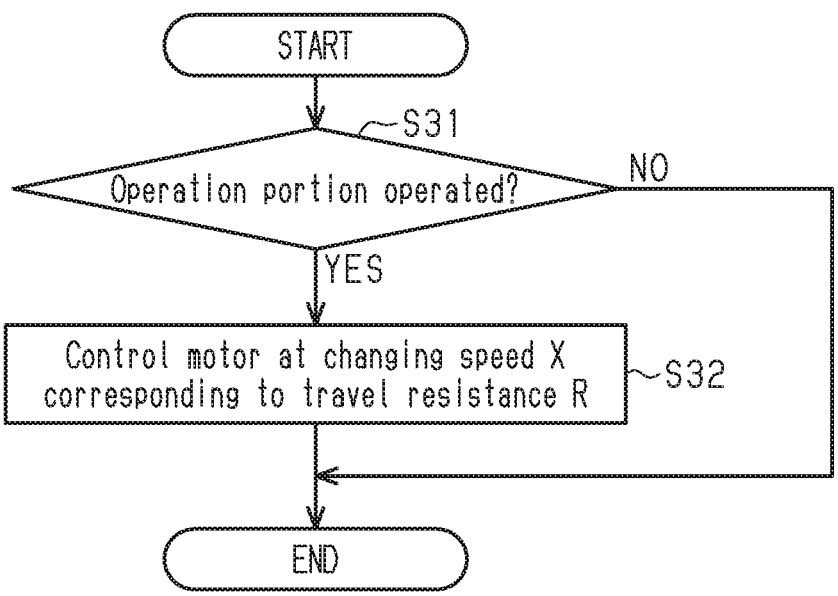
FIG. 7 is a flowchart of a process that sets a response speed in a modification of a second embodiment.

A second embodiment of a control device 40 will now be described with reference to FIGS. 2 and 7. The control device 40 of the second embodiment is the same as the control device 40 of the first embodiment except for the condition for starting to drive the motor 30. Thus, the same reference characters are given to those elements that are the same as the corresponding elements of the first embodiment. Such elements will not be described in detail.

The controller 42 starts driving the motor 30 in accordance with an operation of the operation portion 38. For example, in a case where the operation portion 38 is operated to start driving the motor 30 and the human driving force H is less than or equal to a predetermined value, the controller 42 starts driving the motor 30. The predetermined value is, for example, zero (0). The user operates the operation portion 38, for example, in the case of walking the human-powered vehicle 10. The operation portion 38 can include an operating member and a switch on which an operation is performed to assist the walking of the human-powered vehicle 10. In a case where the operation portion 38 is operated and the motor 30 is driven, the controller 42 controls the motor 30 so that the human-powered vehicle 10 travels at a predetermined speed or lower. The predetermined speed includes, for example, a range of 3 to 5 km/hour.

The controller 42 alters a changing speed X of output of the motor 30 in accordance with the parameter P. The parameter P includes at least one of the travel resistance R of the human-powered vehicle 10, the transmission ratio B of the human-powered vehicle 10, the wheel size of the human-powered vehicle 10, the air resistance coefficient C, the wind velocity Va, the rolling resistance coefficient M, and the value related to the weight of the carried load of the human-powered vehicle 10.

The controller 42 increases the changing speed X as the value of the parameter P increases. The controller 42 alters the changing speed X by varying a time constant included in the filter 86. Additionally, after the filter 86 performs the filtering process on a control command, the controller 42 can alter the changing speed X by setting gain that changes in accordance with time for the control command.

The process for setting the changing speed X will now be described with reference to FIG. 7. In a case where the controller 42 is supplied with power from the battery 28, the controller 42 starts the process and proceeds to step S31 of the flowchart shown in FIG. 7. As long as the controller 42 is supplied with power, the process is executed from step S31 in predetermined cycles.

In step S31, the controller 42 determines whether or not the operation portion 38 is operated. For example, in a state where the human driving force H is less than or equal to a predetermined value, in a case where the operation portion 38 is operated to assist the walking of the human-powered vehicle 10, the controller 42 determines that the operation portion 38 is operated. In a case where the controller 42 determines that the operation portion 38 is not operated, the controller 42 ends the process. In a case where the controller 42 determines that the operation portion 38 is operated, the controller 42 proceeds to step S32.

In step S32, the controller 42 controls the motor 30 at the changing speed X corresponding to the parameter P and ends the process. The controller 42 sets, for example, a time constant corresponding to the changing speed X corresponding to the parameter P in the filter 86. Additionally, after the filter 86 performs the filtering process on a control command, the controller 42 can alter the changing speed X by setting gain that changes in accordance with time for the control command.

Modifications

The description related to the embodiments exemplifies, without any intention to limit, applicable forms of a human-powered vehicle control device according to the present disclosure. The human-powered vehicle control device of the present disclosure can be applicable to, for example, modifications of the embodiments that are described below and combinations of at least two of the modifications that do not contradict each other. In the following modifications, the same reference characters are given to those elements that are the same as the corresponding elements of the embodiments. Such elements will not be described in detail.

In the first embodiment, gain K that changes in accordance with time does not have to be set for the control command on which the filter 86 has performed the filtering process.

Figure 8:
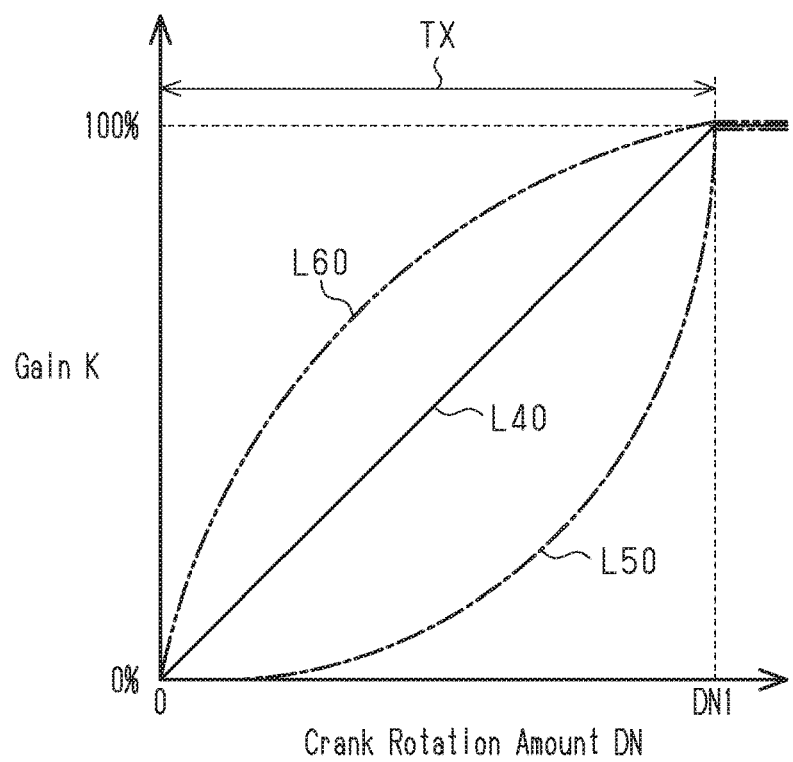
FIG. 8 is a map showing a first example of a relationship between a rotation amount of a crank and gain stored in a storage of the second embodiment.

In the first embodiment, the predetermined period TX can be changed to a period from when the motor 30 starts to be driven until a rotation amount DN of the crank 12 reaches a predetermined amount DN1. FIG. 8 is a graph showing the relationship between gain K and the rotation amount DN of the crank 12 from when the motor 30 starts to be driven. The relationship between gain K and the rotation amount DN of the crank 12 from when the motor 30 starts to be driven is stored in the storage 46 as a table, a relational expression, or a map. When the motor 30 starts to be driven, as shown in FIG. 8, gain K gradually increases from zero (0) as the rotation amount DN of the crank 12 increases. Gain K becomes 100% when the rotation amount DN of the crank 12 reaches the predetermined amount DN1. Subsequently, gain K maintains 100% until the driving of the motor 30 stops. The controller 42 changes the response speed Q by outputting the control command on which the filter 86 has performed the filter process at a rate of gain K. The relationship between the rotation amount DN of the crank 12 and gain K can linearly change as indicated by the solid line L40 shown in FIG. 8 or can change in a curved manner as indicated by the single-dashed line L50 and the double-dashed line L60 shown in FIG. 8.

Figure 9:
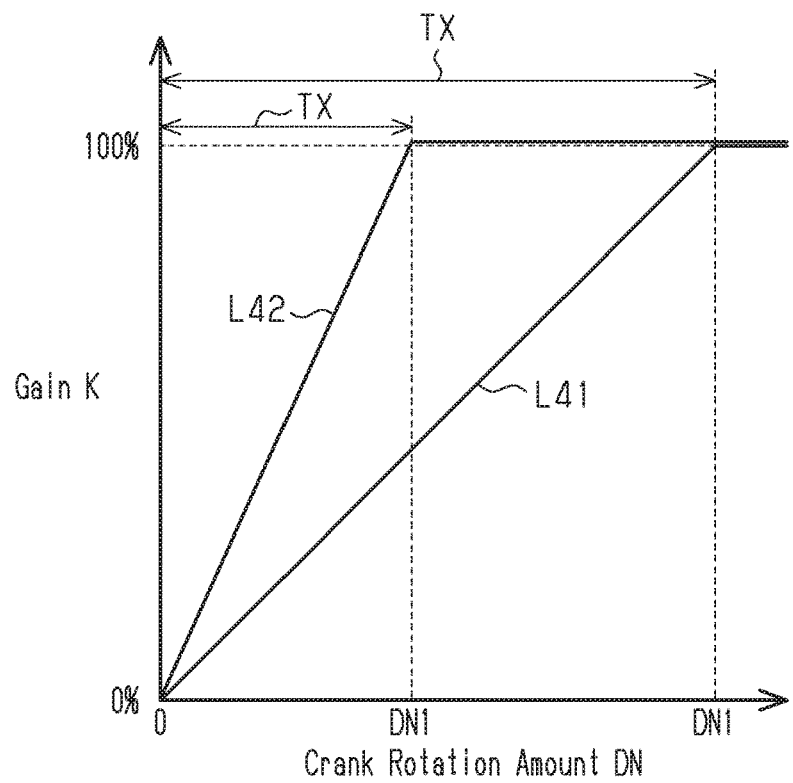
FIG. 9 is a map showing a second example of a relationship between a rotation amount of a crank and gain stored in the storage of the second embodiment.

The relationship between gain K and time t from when the motor 30 starts to be driven until the rotation amount DN of the crank 12 reaches the predetermined amount DN1 can be changed in accordance with at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10. For example, the predetermined amount DN1 can be decreased as at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10 increases. For example, the solid line L41 shown in FIG. 9 shows the relationship between gain K and time t from when the motor 30 starts to be driven until the rotation amount DN of the crank 12 reaches the predetermined amount DN1 in a case where at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10 is less than or equal to a fourth predetermined value P4 that is set for each parameter. For example, the solid line L42 shown in FIG. 9 shows the relationship between gain K and time t from when the motor 30 starts to be driven in a case where at least one of the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10 is greater than the fourth predetermined value P4 set for each parameter.

In the first embodiment and its modifications, steps S13, S14, and S15 can be omitted. In this case, in a case where it is determined in step S12 that the human driving force H is increasing, a time constant can be set so that the response speed Q is set to a predetermined response speed regardless of the parameter P.

In the first embodiment and its modifications, steps S16, S17, and S18 can be omitted. In this case, in a case where it is determined in step S12 that the human driving force H is not increasing, a time constant can be set so that the response speed Q is set to a predetermined response speed regardless of the parameter P.

In each embodiment, in a case where at least one of the parameters P, which include the travel resistance R, the torque TH, the transmission ratio B, the wheel size, the air resistance coefficient C, the value related to the front surface projection area A, the wind velocity Va, the rolling resistance coefficient M, the value related to the weight of the carried load, and the acceleration a of the human-powered vehicle 10, increases and at least one of the parameters P decreases, the response speed Q of the motor 30 or the changing speed X can be changed in accordance with a parameter P that largely affects travel loads of the human-powered vehicle 10 or a parameter P having a predetermined high priority. The storage 46 stores information related to the parameter P that largely affects the travel resistance R of the human-powered vehicle 10 or the parameter P having a predetermined high priority.

In the second embodiment, the process performed by the filter 86 can be omitted. In this case, the controller sets gain that changes in accordance with time for the control command. In the first embodiment and its modifications, the process performed by the filter 86 shown in FIG. 2 can be omitted. In this case, the controller 42 sets gain that changes in accordance with time or the rotation amount DN of the crank 12 for the control command.

What is claimed is:

1. A human-powered vehicle control device comprising:
an electronic controller that controls a motor, which assists in propulsion of a human-powered vehicle in accordance with a human driving force inputted to the human-powered vehicle,
the electronic controller being configured to change a response speed of the motor with respect to a change in the human driving force based on a parameter,
the parameter including at least one of an air resistance, a rolling resistance of a wheel of the human-powered vehicle, an acceleration resistance of the human-powered vehicle, a transmission ratio of the human-powered vehicle, a wheel size of the human-powered vehicle, an air resistance coefficient, a wind velocity, a rolling resistance coefficient, a value indicative of a weight of a carried load of the human-powered vehicle, and an acceleration of the human-powered vehicle, and
the electronic controller being configured to change the response speed of the motor by at least one of: setting the response speed for a case where the human driving force is increasing and a value of the parameter is greater than or equal to a first predetermined value to be higher than the response speed for a case where the human driving force is increasing and the value of the parameter is less than the first predetermined value, and setting the response speed for a case where the human driving force is decreasing and a value of the parameter is greater than or equal to a second predetermined value to be lower than the response speed for a case where the human driving force is decreasing and the value of the parameter is less than the second predetermined value.

2. The human-powered vehicle control device according to claim 1, wherein
the electronic controller is configured to change the response speed of the motor by setting the response speed for a case where the human driving force is increasing and a value of the parameter is greater than or equal to a first predetermined value to be higher than the response speed for a case where the human driving force is increasing and the value of the parameter is less than the first predetermined value.

3. The human-powered vehicle control device according to claim 1, wherein
the electronic controller is configured to set the response speed for a case where the human driving force is increasing to be higher as a value of the parameter increases.

4. The human-powered vehicle control device according to claim 1, wherein
the electronic controller is configured to change the response speed of the motor by setting the response speed for a case where the human driving force is decreasing and a value of the parameter is greater than or equal to a second predetermined value to be lower than the response speed for a case where the human driving force is decreasing and the value of the parameter is less than the second predetermined value.

5. The human-powered vehicle control device according to claim 4, wherein
the electronic controller is configured to set the response speed for a case where the human driving force is decreasing to be lower as the value of the parameter increases.

6. The human-powered vehicle control device according to claim 1, wherein
the electronic controller is configured to set the response speed for a case where the human driving force is increasing to be higher than the response speed for a case where the human driving force is decreasing.

7. The human-powered vehicle control device according to claim 1, wherein
the electronic controller is configured to set the response speed for a predetermined period differently from the response speed for after the predetermined period elapses.

8. The human-powered vehicle control device according to claim 7, wherein
the electronic controller is configured to set the response speed for a case where the human driving force increases after the predetermined period elapses to be higher than the response speed for a case where the human driving force increases during the predetermined period.

9. The human-powered vehicle control device according to claim 7, wherein
the predetermined period is a period from when the motor starts to be driven until a first time elapses.

10. The human-powered vehicle control device according to claim 7, wherein
the human-powered vehicle includes a crank to which the human driving force is input, and
the predetermined period is a period from when the motor starts to be driven until a rotation amount of the crank reaches a predetermined amount.

11. The human-powered vehicle control device according to claim 1, wherein
the electronic controller includes a filter that performs a filtering process on a control command to the motor, and
the electronic controller is configured to change the response speed by varying a time constant included in the filter.

12. A human-powered vehicle control device comprising:
an electronic controller that controls a motor assisting in propulsion of a human-powered vehicle,
the electronic controller being configured to start driving the motor in accordance with operation of an operation portion and alter a changing speed of an output of the motor based on a parameter,
the parameter including at least one of an air resistance, a rolling resistance of a wheel of the human-powered vehicle, an acceleration resistance of the human-powered vehicle, a transmission ratio of the human-powered vehicle, a wheel size of the human-powered vehicle, an air resistance coefficient, a wind velocity, a rolling resistance coefficient, and a value indicative of a weight of a carried load of the human-powered vehicle, and
the electronic controller being configured to alter the changing speed by at least one of: setting the changing speed for a case where the human driving force is increasing and a value of the parameter is greater than or equal to a first predetermined value to be higher than the changing speed for a case where the human driving force is increasing and the value of the parameter is less than the first predetermined value, and setting the changing speed for a case where the human driving force is decreasing and a value of the parameter is greater than or equal to a second predetermined value to be lower than the changing speed for a case where the human driving force is decreasing and the value of the parameter is less than the second predetermined value.

13. The human-powered vehicle control device according to claim 12, wherein
the electronic controller is configured to increase the changing speed as a value of the parameter increases.

14. The human-powered vehicle control device according to claim 12, wherein
the electronic controller includes a filter that performs a filtering process on a control command to the motor, and
the electronic controller is configured to alter the changing speed by varying a time constant included in the filter.

15. The human-powered vehicle control device according to claim 1, further comprising
a detector that detects the parameter.

16. A human-powered vehicle control device comprising:
an electronic controller that controls a motor, which assists in propulsion of a human-powered vehicle in accordance with a human driving force inputted to the human-powered vehicle,
the electronic controller being configured to change a response speed of the motor with respect to a change in the human driving force in accordance with a parameter,
the parameter including at least one of an air resistance, a rolling resistance of a wheel of the human-powered vehicle, an acceleration resistance of the human-powered vehicle, a torque of the human driving force, a transmission ratio of the human-powered vehicle, a wheel size of the human-powered vehicle, an air resistance coefficient, a wind velocity, a rolling resistance coefficient, a value indicative of a weight of a carried load of the human-powered vehicle, and an acceleration of the human-powered vehicle, and
the electronic controller being configured to set the response speed for a case where the human driving force is increasing and a value of the parameter is greater than or equal to a first predetermined value to be higher than the response speed for a case where the human driving force is increasing and the value of the parameter is less than the first predetermined value.

17. A human-powered vehicle control device comprising:
an electronic controller that controls a motor, which assists in propulsion of a human-powered vehicle in accordance with a human driving force inputted to the human-powered vehicle,
the electronic controller being configured to change a response speed of the motor with respect to a change in the human driving force in accordance with a parameter,
the parameter including at least one of an air resistance, a rolling resistance of a wheel of the human-powered vehicle, an acceleration resistance of the human-powered vehicle, a torque of the human driving force, a transmission ratio of the human-powered vehicle, a wheel size of the human-powered vehicle, an air resistance coefficient, a wind velocity, a rolling resistance coefficient, a value indicative of a weight of a carried load of the human-powered vehicle, and an acceleration of the human-powered vehicle, and
the electronic controller being configured to change the response speed of the motor by at least one of: setting the response speed for a case where the human driving force is increasing and a value of the parameter is greater than or equal to a first predetermined value to be higher than the response speed for a case where the human driving force is increasing and the value of the parameter is less than the first predetermined value, and setting the response speed for a case where the human driving force is decreasing and a value of the parameter is greater than or equal to a second predetermined value to be lower than the response speed for a case where the human driving force is decreasing and the value of the parameter is less than the second predetermined value.

18. A human-powered vehicle control device comprising:
an electronic controller that controls a motor assisting in propulsion of a human-powered vehicle,
the electronic controller being configured to start driving the motor in accordance with operation of an operation portion and alter a response speed of an output of the motor in accordance with a parameter,
the parameter including at least one of an air resistance, a rolling resistance of a wheel of the human-powered vehicle, an acceleration resistance of the human-powered vehicle, a transmission ratio of the human-powered vehicle, a wheel size of the human-powered vehicle, an air resistance coefficient, a wind velocity, a rolling resistance coefficient, and a value indicative of a weight of a carried load of the human-powered vehicle, and
the electronic controller being configured to change the response speed of the motor by at least one of: setting the response speed for a case where the human driving force is increasing and a value of the parameter is greater than or equal to a first predetermined value to be higher than the response speed for a case where the human driving force is increasing and the value of the parameter is less than the first predetermined value, and setting the response speed for a case where the human driving force is decreasing and a value of the parameter is greater than or equal to a second predetermined value to be lower than the response speed for a case where the human driving force is decreasing and the value of the parameter is less than the second predetermined value.

* * * * *